United States Patent Office 3,467,543
Patented Sept. 16, 1969

1

3,467,543
METHOD OF MAKING DUSTING STARCH

Alfred D. Campbell, Falls Church, Va., assignor to Standard Brands Incorporated, New York, N.Y., a corporation of Delaware No Drawing. Continuation-in-part of applications Ser. No. 118,518, June 21, 1961, and Ser. No. 480,142, Aug. 16, 1965. This application June 28, 1966, Ser. No. 561,027
The portion of the term of the patent subsequent to Apr. 9, 1985, has been disclaimed
Int. Cl. B44c *1/06*
U.S. Cl. 117—100 9 Claims

ABSTRACT OF THE DISCLOSURE

A method of preparing a free-flowing starch product. An aqueous slurry of starch granules is mixed with a small amount of a powder substance capable of increasing the mobility of powdered starch and with a small amount of a substance effective to reduce the flow rate of the product. The starch granules are separated from the slurry, dried and pulverized. The amount of the second substance used is sufficient to reduce the Kerr Mobility of the starch product to a level within the range from 0.02 to less than 1.0.

This application is a continuation-in-part of my application Ser. No. 480,142, filed Aug. 16, 1965 (now abandoned) which was a continuation-in-part of my application Ser. No. 118,518, filed June 21, 1961 (now abandoned).

This invention relates to new free-flowing starches and new free-flowing modified starches designed especially for use as dusting powders, particularly for dusting dough pieces in the bakery. More particularly, it relates to free-flowing starches and free-flowing modified starches which have been coated with certain metal salts or other mobility increasing agents and also with oils or fats or other mobility decreasing agents. The invention also relates to processes for producing such products and their use as dusting agents.

In the process of this invention any of the common cereal or root starches may be utilized, for example, corn, sorghum, wheat, rice, tapioca and potato starch, as well as modified starches, which term is meant to include any of the common cereal and root starches which have undergone chemical or physical modification, other than a change in their ungelatinized granular form. Such modification may result in alteration of their physical properties after pasting and includes, for example, dextrinization, oxidation, esterification and acid modification. The term starch is used hereinafter to include all such starches and modified starches.

Flour is commonly used as a dusting powder in the baking industry. Efforts have been made to use powdered starch for dusting in bakeries, because it possesses the advantage over flour that it will not support insect life, but the results obtained have not been entirely satisfactory. One reason for this is the fact that ordinary dried and powdered starches are not sufficiently mobile or free-flowing and consequently they have a tendency toward bridging. Moreover, they flow too quickly through the screens of the mechanical dusting equipment commonly used in bakeries with flour and are too dusty, i.e., they generate a great deal of dust in the air surrounding the dusting equipment.

Two methods were employed in this invention to determine the mobility and flow rate of the products. One is the Kerr Mobility test. Kerr Mobility is determined by taking 200 grams of the starch being tested, placing

2 it on a No. 200 U.S. standard mesh sieve and shaking the sieve on a Ro-Tap shaker for 30 seconds. The percentage by weight of starch passing through the sieve is taken as an index of its mobility. Common powdered starches normally have Kerr Mobilities of the order of about 30 to 70%. Occasionally, starches are found which have Kerr Mobilities below this range. Wheat flour normally has a Kerr Mobility in the range of 65 to 85%. Kerr Mobility ratio of a treated starch is the ratio of its Kerr Mobility to the Kerr Mobility of untreated starch.

Flow rates were also determined in some cases on a Day dusting machine which is one of several machines commonly used in bakeries today for dusting dough with flour. The particular machine used in the tests was 16 inches long and was equipped with a shaker arm whose speed was constant at 287 strokes per minute. In these tests, unless otherwise indicated, the Divider screen was used. This screen has 100 holes, approximately 0.0670 inch in diameter, per square inch.

It is known that powdered starches can be rendered mobile by treatment or coating with a variety of metal salts and other compounds in a finely divided state. These compounds are either added to, or formed in situ in, a water slurry of the starch prior to filtering, drying and pulverizing, or they are dry blended with the starch before or after pulverizing. Such processes are described, for instance, in Canadian Patent No. 526,173, which employs tricalcium phosphate, calcium pyrophosphate, calcium phytate, and magnesium phosphate and in U.S. Patent No. 2,614,945 which employs a large group of water-insoluble salts and hydroxides.

The mobile starches produced in this manner have a flow rate which is higher than that of common powdered starches and they are substantially devoid of the tendency to cake or bridge. They have a Kerr Mobility ratio greatly in excess of 1.0. According to the Canadian patent, Column 5, the Kerr Mobility ratio of such mobile starches varies between 1.6 and 9.3 depending upon the amount and character of the salt added to the starch. These mobile starches are designed for use in pneumatic dusting equipment where high flow rates are required. Such starches suffer, however, from the disadvantage that they generate too much dust. For this reason they have not found wide use in bakeries. Moreover, their flow rate is too high for use in mechanical dusting equipment of the type commonly employed in bakeries for dusting with flour.

An object of the invention is to provide a free-flowing starch which is substantially free of any tendency toward caking or bridging and has little tendency to generate dust in the air when used in mechanical dusting equipment. Another object of the invention is to provide a product having these characteristics and in addition a flow rate which is a great deal lower than that of common powdered starch. A further object of the invention is to provide a dusting starch having the aforementioned characteristics which can be used advantageously in the mechanical dusting equipment commonly found in bakeries today. A particular object of the invention is to provide a simple and economical method of preparing dusting starch by coating starch in an aqueous slurry.

In accordance with the invention, starch is treated or coated in a slurry with both a small amount of a metal salt or other chemical compound capable of increasing its mobility substantially and a small amount of an oil or fat or equivalent agent effective to reduce the flow rate of the product, the treated product is separated from the slurry, dried and powdered. The product obtained offers advantages over dusting flour in that it generates much less dust, will not support insect life and less of it is required for effective dusting. The result obtained is surprising in view of the fact that the coating of starch with the oil or fat alone results in a product which tends to bridge and has a flow rate which is erratic and usually too low for satisfactory use as a dusting powder. The product of this invention is actually less mobile than common powdered starch in terms of its Kerr Mobility or its flow rate. Yet surprisingly it possesses the non-bridging characteristic commonly associated with highly mobile starches. Though Kerr Mobility and Day Duster flow rate do not correlate well numerically, they do vary in the same direction and are manifestations of one and the same property as evidenced by the fact that either can be used to evaluate the product for dusting purposes. It was also found that, unexpectedly, practically all of the oil or fat is absorbed by the starch in the slurry and remains with the starch during filtration, drying and pulverizing.

In the present invention any of the compounds disclosed in the aforementioned Canadian and U.S. patents or equivalent compounds may be used to increase the mobility of the starch. Tricalcium phosphate is preferred. To reduce the flow rate I may use, for example, mineral oils, any of the glyceridic oils and fats, for example, the vegetable and animal oils and fats, silicone oils and beeswax. If it is desired to use a higher melting fat, one should be chosen which is liquid at the ambient temperature in the bakery or other area where the starch is to be used. In bakeries the ambient temperature is usually about 70–100° F. The vegetable oils are economical and convenient to use. Suitable vegetable oils are, for example, corn, soybean, cottonseed, olive and peanut oils. Oils having a low tendency to oxidize such as olive oil are preferred since starch coated therewith has much less tendency to lose on storage the desirable properties imparted to it by the process of the invention. The more oxidizable oils may also be employed but in this case it is desirable to increase the shelf life of the coated starch by incorporating an antioxidant in the oil.

The starch may be treated or coated first with one of the agents employed in this invention and then with the other or with both simultaneously. When these agents are applied separately, it makes no appreciable difference which is applied first.

The metal salts should be employed in an amount effective to substantially increase the mobility of powdered starch. Very small amounts, usually less than about 1.0% are sufficient for this purpose. Greater amounts may be added if desired, although usually a relatively small further increase in mobility is imparted by increasing the amount substantially beyond about 1.25%. Of course, the amount required to impart a given mobility will vary depending upon the salt used. In the case of tricalcium phosphate satisfactory results can be obtained, for instance, with amounts varying from about 0.1% to about 1.0%. About 0.4% to 0.8% is preferred.

Commercial starches normally contain a small amount of fatty materials. Some of this material is extractable with an organic solvent like carbon tetrachloride and would appear therefore to be on the surface of the starch granules. The rest of the fatty material is extractable if the starch is first hydrolyzed. Corn starch, for instance, may normally contain fatty material extractable with carbon tetrachloride in amounts varying from traces to as much as about 0.12%. Such fatty materials should be taken into account in determining the amount of oil or fat or equivalent mobility reducing material to be added in the process of my invention.

The amount of mobility reducing material required in my invention to obtain the desired result will also vary, depending upon the nature of the mobility reducing material and the thoroughness and uniformity with which it is incorporated in the product and the amount and kind of metal salt or equivalent agent added to the starch. In general the amount of oil or fat added in the process of my invention should be such as to give a product wherein the amount of oil and fat extractable by $CCl_4$ does not exceed about 0.5% because the product will not flow satisfactorily if this amount is exceeded substantially. The total extractable oil and fat will consist of extractable fatty material already present on the granular starch starting material and that absorbed by the starch granules in the coating process of this invention. In the case of corn oil and olive oil the total extractable oil and fat preferably amount to about 0.15% to 0.30% and advantageously about 0.22%.

It is essential that the relative amounts of the two coating agents employed be chosen to give a coated starch product having a Kerr Mobility ratio between about 0.02 and less than 1.0 and thus make the starch suitable for use in mechanical dusting machines of the type of the Day Duster.

The oil or fat or equivalent agent is dispersed in a slurry of the starch in water or other suitable liquid medium. It is convenient to disperse the salt or other mobility increasing agent in the same slurry. The slurry is agitated until the oil or fat is absorbed by the starch. The slurry is then filtered and the coated starch is dried and pulverized in the conventional manner. Absorption of the oil or fat occurs quickly, usually within the first few minutes of agitation. The speed of absorption will depend upon the size of the equipment used and the violence of the agitation. Essentially all of the oil added to the slurry is retained by the starch. In the specific examples given below, the agitation period was one hour. This length of time is not critical and was chosen only to assure maximum distribution of the additives.

The concentration of starch in the slurry employed in the process of this invention is not critical and may vary greatly. Also, the temperature of the slurry may vary widely so long as it is held below about 130° F. to avoid pasting the starch.

It has been found that the flow rate of the dried and pulverized coated products obtained by the process of this invention can be reduced by subjecting them to mechanical blending, for instance in a Ribbon blender. The degree to which the flow rate is reduced depends upon the duration of the blending. The reduction reaches a maximum after which further blending does not bring about any further reduction. The reason for this effect is not known. However, it is probable that blending brings about a more intimate and even distribution of the oil or fat over the starch granules. Advantage may be taken of this effect to control the flow rate of the product and thus obtain products having a uniform flow rate. In this respect the products of the invention offer important advantages over flour for dusting because the flow rate of flour varies greatly depending upon its geographical source and its use in the bakery frequently necessitates considerable adjustment in the dusting equipment.

The invention is illustrated by the following specific examples. In these examples and throughout the specification, all percentages are by weight and, unless otherwise stated, are based on the dry substance weight of the starch. The tricalcium phosphate used in the examples was of food grade and consisted of particles 98.2% of which passed through a No. 325 U.S. standard mesh screen.

In Examples 1 to 8 the Kerr Mobility of the final product was determined but not the Kerr Mobility of the starting material. To determine mobility ratio of the products, it is necessary to have the Kerr Mobility of a control. As indicated above, the Kerr Mobility of powdered common starch varies from about 30 to 70%. Therefore, the Kerr Mobility ratio of the products of these examples would be expected to vary between about 0.04 and about 0.78 depending upon the Kerr Mobility of the starting material.

In Examples 1 to 11 no actual determination was made of the content of fatty material in the particular corn starch used as the starting material. Since powdered corn starch generally contains a small amount of fatty material extractable with $CCl_4$, this amount should be added to the percentage of oil added in the example to obtain the total amount of fatty material extractable with $CCl_4$ from the final product.

EXAMPLE 1

Seventy-one and one-half gallons of 23.7° Baumé starch slurry, containing 300 lbs. dry substance corn starch, was diluted to 19.3° Baumé and heated while under agitation to 120° F. Six-tenths of a pound (0.2%) of refined corn oil, stabilized with TENOX–S–1, an antioxidant composed of 20% propyl gallate, 10% citric acid and 70% propylene glycol, was then added and the mixture was agitated for 5 minutes. One and one-half pounds (0.5%) of tricalcium phosphate was added and the mixture was agitated for one hour while maintaining the temperature at 120° F.

The slurry was then diluted with water to 15.0° Baumé, filtered without washing and dried in a current of air heated to 220° F. to a moisture content of 10.4%. The dried product was ground in a hammer mill so that 98% would pass a No. 200 U.S. standard sieve.

The product had a Kerr Mobility of 7.8% and was considered satisfactory.

EXAMPLE 2

One hundred fifty-five gallons of 19.0° Baumé starch slurry, containing 500 lbs. corn starch dry substance, was heated while under agitation to 120° F. Two and one-half pounds (0.5%) of tricalcium phosphate and one pound (0.2%) of refined corn oil stabilized with TENOX–S–1 were added simultaneously and the mixture agitated for one hour while maintaining the temperature at 120° F.

The slurry was then diluted with water to about 15° Baumé, filtered without washing and dried in a current of air heated to 220° F. to a moisture content of 10.6%. The dried product was ground so that 98% would pass a No. 200 U.S. standard sieve. The product had a Kerr Mobility of 11.1 and was considered satisfactory.

EXAMPLE 3

Three hundred twenty-four gallons of 19.0° Baumé starch slurry, containing 1,050 lbs. corn starch dry substance, was heated while under agitation to 120° F. One and eighty-nine one hundredths pounds (0.18%) soft hydrogenated corn oil, having an iodine value of 86 and melting at 90.8° F., was added. Five and one quarter pounds (0.5%) of tricalcium phosphate was added and the mixture agitated for one hour while maintaining the temperature at 120° F.

The slurry was then diluted to about 15° Baumé, filtered without using wash water and dried in a current of air heated to 220° F. to a moisture content of 10.5%. The dried product was ground so that 98% would pass a No. 200 U.S. standard sieve. The product had a Kerr Mobility of 8.5 and was considered satisfactory.

EXAMPLE 4

Two hundred sixty-two gallons of 19.0° Baumé starch slurry, containing 850 lbs. corn starch dry substance, was heated while under agitation to 120° F. Two and twenty-four one hundredths pounds of soft hydrogenated corn oil, having an iodine value of 86 and melting at 90.8° F. (0.264% based on the dry substance starch) was added to the slurry and it was agitated for 5 minutes. To this mixture was added four and twenty-five one hundredths pounds (0.5%) tricalcium phosphate and the slurry was agitated for one hour while maintaining a temperature of 120° F.

The slurry was then diluted with water to about 15° Baumé, filtered without washing and dried in a current of air heated to 220° F. to a moisture content of 9.6%. The dried product was ground so that 98% would pass a No. 200 U.S. standard sieve. The product had a Kerr Mobility of 5.5 and was considered satisfactory.

EXAMPLE 5

Three hundred twenty-four gallons of 91.0° Baumé starch slurry, containing 1,050 lbs. corn starch dry substance, was heated while under agitation to 120° F. Stabilized refined corn oil in the amount of 0.16% was added to the slurry and it was agitated for 10 minutes. This oil contained butylated hydroxyanisole and butylated hydroxytoluene each in the amount of 0.009% based on the starch dry substance. Five and one-quarter pounds (0.5%) of tricalcium phosphate was added to the slurry and it was agitated for one hour while maintaining the temperature at 120° F. The slurry was then diluted with water to about 15° Baumé, filtered without washing and dried in a current of air heated to 220° F. to a moisture content of 7.8%. The dried product was ground so that 98% would pass a No. 200 U.S. standard sieve. The product had a Kerr Mobility of 6.0% and was considered satisfactory.

EXAMPLE 6

Two hundred sixty-six gallons of 19.0° Baumé starch containing 860 lbs. of corn starch dry substance, was heated while under agitation to 120° F. Stabilized refined corn oil in the amount of 0.238% was added to the slurry. This oil contained 0.013% butylated hydroxyanisole and 0.013% butylated hydroxytoluene based on the starch dry substance.

The mixture was agitated for 5 minutes and then five and one-quarter pounds (0.5%) of tricalcium phosphate was added to the slurry, which then was agitated for one hour while maintaining a temperature of 120° F.

The slurry was then diluted with water to about 15° Baumé filtered without washing and dried in a current of air heated to 220° F. to a moisture content of 9.0%. The dried product was ground so that 98% would pass a No. 200 U.S. standard sieve. The product had a Kerr Mobility of 2.5% and was considered satisfactory.

EXAMPLE 7

This example demonstrates that time of mixing in slurry is not important. A range of from one hour to 15 hours is covered.

Three hundred and nine gallons of 19° Baumé starch slurry, containing 1,000 lbs. corn starch dry substance, was heated to 120° F. while under agitation. Refined corn oil in the amount of 0.16%, stabilized with 0.009% butylated hydroxyanisole and 0.009% butylated hydroxytoluene based on the starch by substance, was added to the slurry and the mixture was agitated for 5 minutes. Five pounds (0.5%) of tricalcium phosphate was then added and the slurry agitated for 15 hours while maintaining the temperature at 120° F.

Portions of this slurry were withdrawn after agitation for one hour, 5 hours, 10 hours, and 15 hours and these portions were filtered and dried in a current of air heated to 220° F. The products were ground so that 98% would pass a No. 200 U.S. standard sieve. They were subjected to the Kerr mobility test and their flow rate in the Day duster machine was measured. The following results were obtained indicating that mobility and flow rate were not significantly affected by increased mixing times.

| Mixing time in hours: | Kerr mobility, percent | Day duster delivery (gms./10 minutes) |
|---|---|---|
| 1 | 2.5 | 630 / 786 |
| 5 | 3.4 | 644 / 788 |
| 10 | 3.5 | 712 / 673 |
| 15 | 3.9 | 682 / 601 |

EXAMPLE 8

This example demonstrates that the addition of oil alone to the slurry does not produce a satisfactory product, that is, treatment with tricalcium phosphate or some other substance with a similar activity tending to increase mobility, if necessary.

Two hundred forty-seven gallons of 19.0° Baumé corn starch slurry, containing 800 lbs. starch dry substance, was heated with agitation to 120° F. Refined corn oil in the amount of 0.22%, stabilized with 0.01% butylated hydroxyanisole and 0.01% butylated hydroxytoluene based on the starch dry substance, was added to the slurry and this mixture was agitated for one hour while maintaining the temperature at 120° F.

The slurry was then diluted with water to about 15° Baumé, filtered without washing and dried at 220° F. to a moisture content of 10.2%. The dried product was ground so that 98% would pass a No. 200 U.S. standard sieve.

The average flow rate of this product was about 50 grams in 10 minutes through the divider screen of the Day duster. At the same setting of this machine the flow rate for flour was approximately 1,500 grams in 10 minutes.

EXAMPLE 9

Corn starch was treated with various amounts of tricalcium phosphate and corn oil, as indicated in the following table, by a procedure essentially the same as described in Example 5. The flow rates of the products obtained are given in this table:

| Batch No.: | Percent ingredients | Day duster delivery (gms./10 minutes) | Average |
|---|---|---|---|
| 1 | 0.16 refined corn oil<br>0.35 tricalcium phosphate | 368<br>328 | 348 |
| 2 | 0.22 refined corn oil<br>0.35 tricalcium phosphate | 162<br>169 | 165.5 |
| 3 | 0.16 refined corn oil<br>0.75 tricalcium phosphate | 3,212<br>3,474 | 3,343 |
| 4 | 0.22 refined corn oil<br>0.75 tricalcium phosphate | 484<br>555 | 519.5 |

EXAMPLE 10

Forty-six thousand seven pounds of starch dry substance at 18° Baumé was heated with agitation to 120° F.; 0.24% relned corn oil, stabilized with 0.01% butylated hydroxyanisole and 0.01% butylated hydroxytoluene based on the starch dry substance, was added to the slurry and the mixture was agitated for 15 minutes; 0.66% tricalcium phosphate was added and the slurry agitated for one hour at 120° F. The slurry was then diluted to 15.5° Baumé, filtered and dried in a current of air heated to 220° F. to an average moisture content of 8.9%. The dried product was ground so that 98% would pass a No. 200 U.S. standard sieve. Its flow rate in the Day duster was 1,185 grams in 10 minutes. This product was placed in a Ribbon blender of 60,000 lbs., capacity along with 4% gritted starch fines, and blended for 2 hours after all the material was in. The resulting product exhibited a flow rate in the Day duster of approximately 500 grams in 10 minutes.

The gritted starch fines used in this example were prepared as follows: An aqueous corn starch slurry was heated to or beyond the point of incipient gelatinization so as to cause the surfaces of the starch granules to assume a mucilaginous condition. The starch was separated in this condition from the slurry by filtration and then subjected to drying by hot air, causing the granules to agglomerate into hard clumps, or clusters. This gritted starch was subjected to a sieving operation and the portion which passed through a No. 35 U.S. standard sieve but was retained on a No. 100 U.S. standard sieve was used in the present example.

The addition of gritted starch fines is not necessary and does not appear to have an important effect on the flow rate of the product through the screens of the Day duster. Experiments have shown that the reduction in flow rate resulting from the blending operation in this example is substantially the same whether the gritted starch fines are present during the blending or not.

EXAMPLE 11

One hundred fifty-five gallons of 19.0° Baumé starch slurry, containing 500 lbs. corn starch dry substance, was heated while under agitation to 120° F. Two and one-half pounds (0.5%) of tricalcium phosphate was added and the mixture agitated for 4 minutes. One pound (0.2%) of refined corn oil stabilized with TENOX–S–1 was added and the mixture agitated for one hour while maintaining the temperature at 120° F.

The slurry was then diluted with water to 15° Baumé, filtered without washing and dried in a current of air heated to 220° F. to a moisture content of 11.0%. The dried product was ground so that 98% would pass a No. 200 U.S. standard sieve. The product had a Kerr Mobility of 23.4% and was considered satisfactory.

EXAMPLE 12

A water slurry of corn starch was prepared containing 92,950 pounds of dry substance starch and having a Baumé of 16.3° at 60° F. (28.96% dry substance). One half of this slurry was filtered and the filter cake was dried and powdered so that more than 98% of the particles would pass a 200 mesh screen.

111 pounds of olive oil (0.24% based on the starch) and 307 pounds of tricalcium phosphte (0.66% based on the starch) were added to the remaining half of the corn starch slurry. The mixture was blended by agitation for one hour at 120° F. and then filtered. The filter cake was dried and powdered in the same manner as the untreated portion of the starch. This product was considered satisfactory as a dusting starch for use in the Day duster.

Samples of the two products analyzed as follows:

| | Untreated (common) starch, percent | Treated-dusting starch, percent |
|---|---|---|
| Moisture | 12.1 | 8.2 |
| Oil extracted with CCl₄ | 0.05 | 0.23 |
| Calcium calculated as tricalcium phosphate | 0.04 | 0.56 |
| Day duster flow rate (g./10 min.) | 2,156 | 898 |
| Kerr mobility | 28.25 | 2.87 |

Mobility ratio of treated starch___2.87/28.25=0.102

EXAMPLE 13

4 liters of 19.0 Bé. corn starch slurry having a pH of 4.65 was heated while stirring to 120° F. 3.88 grams (0.25%) of silicone oil (Dow Corning 550 Fluid) was added to the slurry and then 0.5% of tricalcium phosphase (mixed with about 100 ml. of cold tap water) was added. The pH of the mixture was 5.40. The slurry was stirred for one hour, diluted to about 15.0° Bé. at 102–103° F. and the pH was adjusted to 4.7 with hydrochloric acid. The slurry was filtered without washing and dried in a current of air heated to 220° F. to a moisture content of 9.38%. The dried product was ground in a Mikro-Pulverizer hammer mill fitted with an exit screen having 0.039 inch diameter openings. The ground product showed a Kerr Mobility of 13.8%. The Kerr Mobility of a control sample of corn starch having a moisture content of 8.94 was 41.4%. Thus the Kerr Mobility Ratio of the treated product amounted to 0.33.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A method of preparing a free-flowing powdered starch product which comprises intimately mixing an aqueous slurry of starch granules with a small amount of an edible powdered substance capable of increasing the mobility of powdered starch and with a small amount of a substance effective to reduce the flow rate of the product, the amount of the powdered substance being sufficient to increase the mobility of powdered starch and the amount of the second substance being sufficient to reduce the Kerr Mobility ratio of the product to a level within the range from 0.02 to less than 1.0, separating the coated starch from the slurry, drying the coated starch and pulverizing it.

2. A method as defined in claim 1 wherein the second substance is an oil or fat.

3. A method as defined in claim 2 wherein the dried pulverized starch product is subjected to mechanical blending to reduce its flow rate.

4. A method as defined in claim 2 wherein the oil or fat is glyceridic.

5. A method as defined in claim 4 wherein the amount of the powdered substance is within the range from about 0.1% to 1.0% based on the dry substance weight of the starch and the amount of the second substance is such that the amount of oil and fat extractable from the starch product with $CCl_4$ is within the range from about 0.15 to 0.5% based on the dry weight of the starch.

6. A method as defined in claim 5 wherein the amount of the powdered substance is within the range from 0.4% to 0.8% based on the dry substance weight of the starch.

7. A method as defined in claim 5 wherein the powdered substance is tricalcium phosphate and the second substance is a vegetable oil.

8. A method of preparing a free-flowing powdered starch product which comprises intimately mixing an aqueous starch slurry with between about 0.4% and 0.8% of powdered tricalcium phosphate based on the dry substance weight of the starch and an amount of a vegetable oil such that the amount of fatty material extractable from the starch product with $CCl_4$ is within the range from 0.15% to 0.30% based on the dry substance weight of the starch, and sufficient to reduce the Kerr Mobility ratio of the starch product to a level within the range from 0.02 to less than 1.0, separating the starch product from the slurry and then drying and pulverizing the starch product.

9. A method as defined in claim 8 wherein the vegetable oil is olive oil.

References Cited

UNITED STATES PATENTS

| | | | |
|---|---|---|---|
| 2,144,371 | 1/1939 | Griffith et al. | 99—118 |
| 2,554,143 | 5/1951 | Hinz et al. | 117—100 |
| 2,614,945 | 10/1952 | Krisan | 117—100 |
| 2,845,368 | 7/1958 | Frederickson | 127—38 |
| 3,003,894 | 10/1961 | Frederickson | 127—71 |

FOREIGN PATENTS 526,173    6/1956    Canada.

WILLIAM D. MARTIN, Primary Examiner

MATHEW R. P. PERRONE, Jr., Assistant Examiner

U.S. Cl. X.R.

127—71; 106—211